April 28, 1936. G. A. LYON 2,039,013
COVER FOR SPARE TIRES OF AUTOMOBILES
Filed Feb. 27, 1930 2 Sheets-Sheet 1
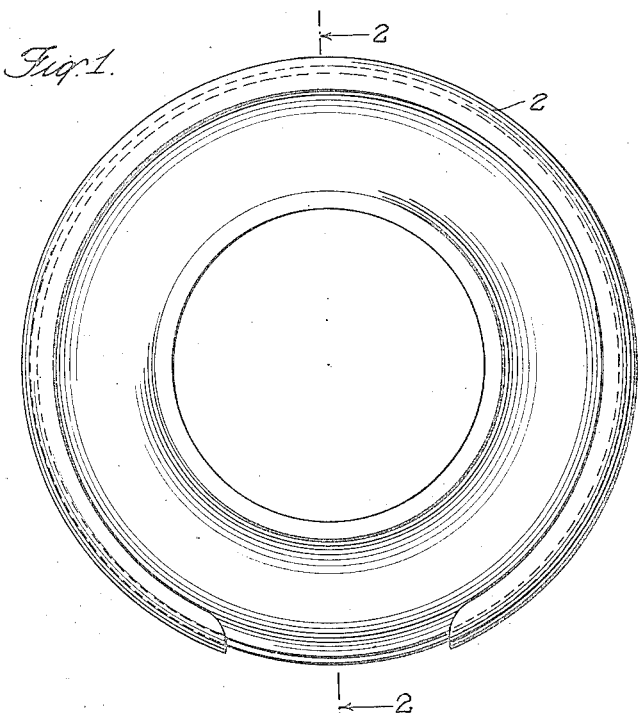
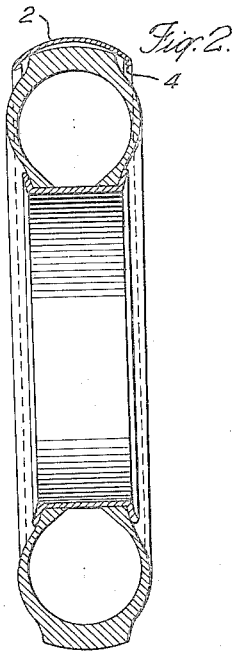
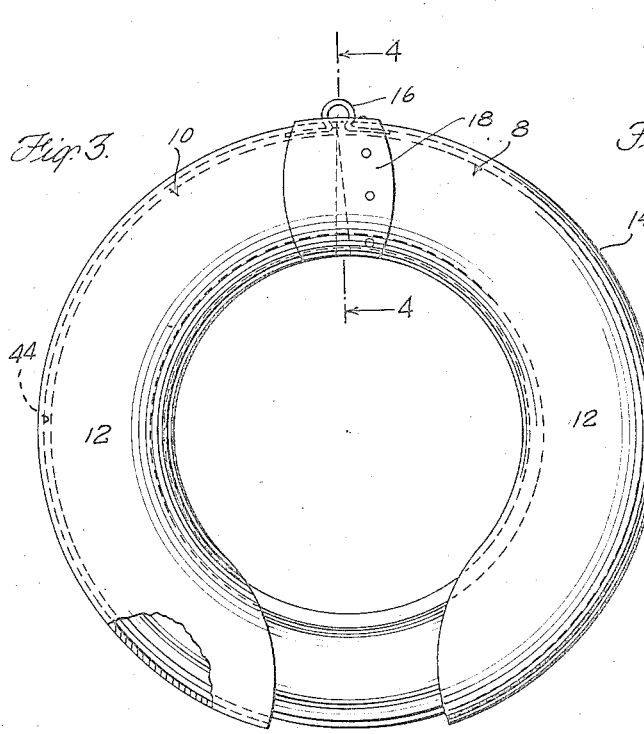
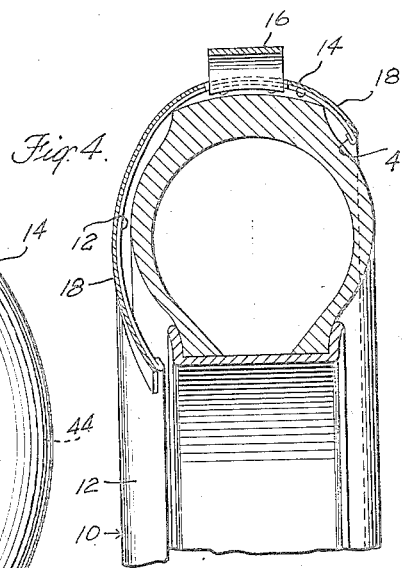
INVENTOR
GEORGE ALBERT LYON
BY
ATTORNEYS

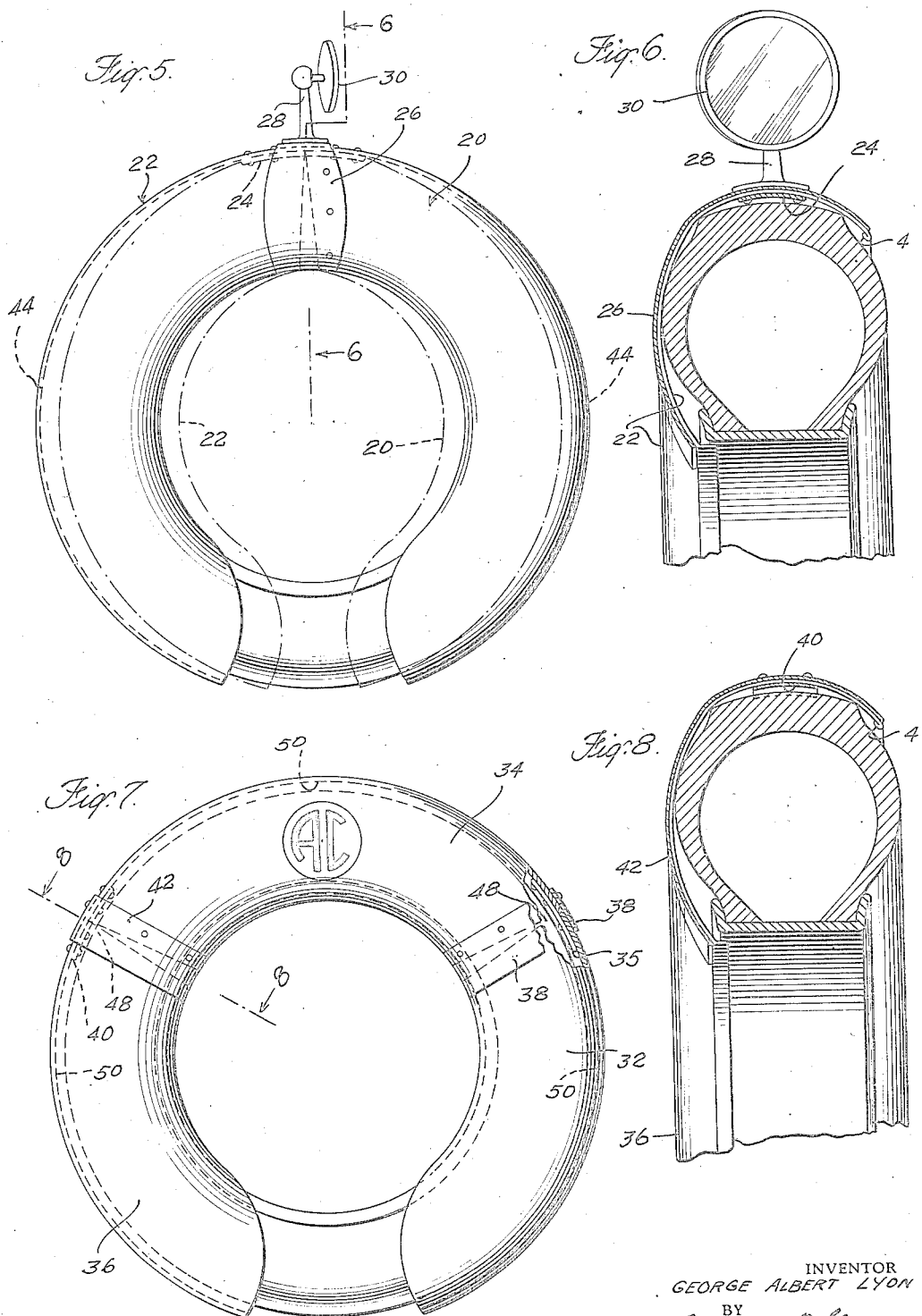

Patented Apr. 28, 1936

2,039,013

UNITED STATES PATENT OFFICE 2,039,013

COVER FOR SPARE TIRES OF AUTOMOBILES

George Albert Lyon, Allenhurst, N. J., assignor to Lyon Incorporated, Asbury Park, N. J., a corporation of Delaware Application February 27, 1930, Serial No. 431,696

3 Claims. (Cl. 150—54)

This invention relates to covers for the spare tires for automobiles.

The principal objects of the invention are to improve the construction and mode of operation of tire covers for covering spare tires and to produce a tire cover which has a highly ornamental and attractive appearance, which may be readily applied to and removed from a spare tire, which will furnish a satisfactory protection for the tire and which is simple in construction and may be manufactured at a relatively low cost.

With these and other objects in view the invention consists in a tire cover embodying the novel and improved features and constructions of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings—

Figure 1 is a view in side elevation illustrating a tire cover, embodying one form of the invention, applied to a tire;

Figure 2 is a sectional view taken substantially on the line 2—2 of Figure 1;

Figure 3 is a view in side elevation illustrating a tire cover, embodying another form of the invention, applied to a tire;

Figure 4 is a sectional view taken substantially on the line 4—4 of Figure 3;

Figure 5 is a view in side elevation illustrating a tire cover, having the same general construction as that illustrated in Figure 3, applied to a tire, with certain of the parts somewhat modified in construction and with a mirror attached to the cover;

Figure 6 is a sectional view taken substantially on the line 6—6 of Figure 5;

Figure 7 is a view in side elevation illustrating a tire cover embodying a further modification of the invention, applied to a tire; and Figure 8 is a sectional view taken substantially on the line 8—8 of Figure 7.

In the form of the invention illustrated in Figures 1 and 2 the tire cover consists of an annular member 2 made of relatively stiff sheet material and formed to extend about and cover the greater part of the peripheral or tread portion of a tire. This annular member is constructed to extend across the tread portion of the tire and preferably to extend beyond the tread portion on each side thereof and has a recessed form in cross section on the inside thereof to receive the tread portion of the tire, as clearly shown particularly in Figure 2. As shown in the drawings this member is curved in cross section to give the same a concavo-convex form. The radius of transverse curvature of the member 2 is preferably made somewhat less than the transverse curvature of the tread surface of the tire so that said member will contact with the tire at the margins of the tread, as shown in Figure 2 and will be out of contact with the tread between these margins. The tire cover member 2 is constructed with an inside diameter somewhat less than the outside diameter of the tire and is made of relatively stiff resilient sheet material so that it may be expanded in applying said member and removing the same from the tire. This member may be made from a strip of sheet steel formed into the proper shape by rolling operations.

The annular member 2 is made in the form of a divided ring and is preferably constructed so that the ends of the ring are separated by some distance when said member is applied to a tire, as shown in Figure 1.

In applying the tire cover to a tire, the tire is preferably placed upon the ground or upon a horizontal support and the tire cover is applied to the tire in this position. One end portion of the ring is manipulated to engage the tire in the recess within the same, the end portions of the ring being relatively deflected laterally of the plane of the ring during this operation. Then, working from the end portion first applied, the cover is worked progressively over the tire In applying the cover to a tire the ring 2 is expanded so that it will pass over the periphery of the tire. Upon the release of the ring, the contraction of the same resulting from the resiliency of the material will cause the ring to contract into engagement with the tire so that it will hold itself firmly in position thereon. The cover ring is preferably applied so that the space between the ends thereof is located at the base of the tire when the tire is supported by a carrier. This position of the cover ring will result in efficient drainage.

At its lateral margins the sheet material of the cover ring 2 is turned back inwardly against the body of the material as indicated at 4 in Fig. 2, so as to provide the ring with finished rounded edges.

In the form of the invention illustrated in Figs. 3 and 4, the tire cover comprises cover sections 8 and 10 connected together to form an annular cover or ring for covering the tire. Each of said sections preferably has the form in cross-section shown in Fig. 4. As shown in this figure each section is provided with a lateral wall 12 formed to extend over and cover a side wall of the tire, and with a peripheral wall 14 formed to extend over and cover the peripheral or tread portion of the tire. Both the side wall 12 and the peripheral wall 14 have a recessed form in cross-section to receive respectively the side wall of the tire and the tread portion of the tire. As shown in Fig. 4 both the side wall 12 and the peripheral wall 14 have a concavo-convex curved form in cross-section. The wall 14 is formed in an arcuate curvature, the radius of which is considerably less than the radius of the transverse curvature of the tread surface of the tire so that the cover sections will rest upon the tire at the margins of the tread portion and will be out of contact with the tread portion at points between said margins.

The sections 8 and 10 are connected together to form a cover ring arranged to extend about the greater part of the tread portion and over the greater part of one side wall of a tire. The two sections are however, arranged for relative movement in directions to expand and contract said ring and are acted upon by a spring which tends to move relatively said sections in directions to contract the ring.

In the construction shown in Figs. 3 and 4 the sections 8 and 10 are pivotally connected by means of a spring 16 to swing relatively about an axis substantially parallel with the axis of the ring and located adjacent the periphery of the ring. The spring 16 is formed with a central looped shaped portion and with laterally extending arms located respectively within the sections 8 and 10 of the cover, these arms being secured to the sections of the cover in any suitable manner. The central looped-shaped portion of the spring projects outwardly through an opening formed by cutting away portions of the sections 8 and 10.

In order to cover the joint between the sections 8 and 10, a cover plate 18 is attached to the section 8 and is constructed to extend over the adjacent ends of the sections 8 and 10 as shown in Fig. 3. This cover plate is perfectly shaped to conform to the transverse curvature of the sections and preferably extends over the side portions and the peripheral portions of said sections. The cover plate is formed with an opening through which the looped-shaped portion of the spring 16 extends.

In applying the tire cover shown in Figs. 3 and 4 to a tire the sections 8 and 10 are moved relatively to expand the ring formed by the same and the cover is then applied laterally over the tire to bring the sections 8 and 10 substantially into the transverse relation to the tire shown in Fig. 4. Upon the release of both sections, the spring 16 will move the same relatively in a direction to contract the ring and the action of the spring will bring the sections into contact with the peripheral portion of the tire at the margins of the tread as shown in Fig. 4, thereby clamping the cover securely on the tire. In removing the cover from the tire the sections 8 and 10 are moved relatively to expand the ring, and the tire cover is then removed by a lateral movement thereof with relation to the tire.

Figs. 5 and 6 show a construction similar to that shown in Figs. 3 and 4. The tire cover shown in Figs. 5 and 6 comprises pivotally connected sections 20 and 22 each having substantially the same general construction and the same cross-sectional shape as the sections 8 and 10 shown in Figs. 3 and 4. The sections 20 and 22 form a tire cover ring and are relatively movable to expand and contract the ring. These sections are pivotally connected or are connected for relative swinging movement by means of a leaf spring 24 located within said sections and extending across the joint between the same and secured at its ends to the respective sections by suitable fastening devices or by welding the same to the sections. A cover plate 26 is secured to the section 20 and is arranged to extend over the adjacent ends of both sections to cover the joint between the same, this cover plate having the same general construction as the cover plate 18 shown in Figs. 3 and 4.

Upon the cover plate 26 is secured a standard 28 upon which is supported a mirror 30 connected to the standard preferably by a universal joint so that the mirror may be adjusted in different angular positions with relation to the standard. The position of the mirror may be adjusted about the axis of the tire by adjusting the tire cover about said axis.

Figs. 7 and 8 show a construction similar to that shown in Figs. 5 and 6 except that the tire cover comprises three sections 32, 34 and 36, connected together at their adjacent ends to form a tire cover ring and arranged for relative movement to expand and contract the ring. As shown in this figure the sections 32 and 34 are pivotally connected by means of a leaf spring 35 and the joint between the two sections is covered by means of a cover plate 38. The sections 34 and 36 are pivotally connected by means of a leaf spring 40 and the joint between the sections is covered by means of a cover plate 42. The sections 32, 34 and 36 as shown in Fig. 8 have substantially the same form in cross-section as the sections 20 and 22 shown in Figs. 5 and 6 and the sections 8 and 10 shown in Figs. 3 and 4. The tire cover shown in Figs. 5, 6, 7 and 8 is applied to and removed from the tire in substantially the same manner as the tire cover shown in Figs. 3 and 4. In applying the tire cover to a tire, the sections are moved relatively to expand the ring formed by the same and are then released allowing the spring or springs to move relatively the sections to contract the ring and bring the sections into gripping relation with the tire.

The outside diameters of tires vary to a considerable degree even in the same sizes as given by the manufacturers. The wearing down of the tread of a tire during its use will cause a considerable variation in its outside diameter. The tire cover constructions above described will fit tires the outside diameters of which vary to a considerable extent. In each case the cover, of course, will fit accurately a tire the periphery of which has the same arcuate curvature as the normal curvature of the cover. When one of the covers shown in Figs. 1–6 inclusive is applied to a tire having a smaller diameter the cover will contact with the outer surface of the tread of the tire chiefly at two points each located substantially at the ends of the horizontal diameter of the tire as shown in these figures. These points are located at an angular distance of substantially 90° from the central point of the cover. When one of the tire covers shown in these figures is applied to a tire the outside diameter of which is greater than that of the tire having the same peripheral curvature as the normal curvature of the cover or the sections thereof, the cover will contact with with the periphery of the tire chiefly at three points, namely, at the end of the annular cover and at a point midway between these ends. When the construction shown in Figs. 7 and 8 is applied to a tire having an outside diameter greater than that of a tire having the same peripheral curvature as the sections 32, 34 and 36, the cover will contact with the periphery of the tire chiefly at four points, namely, at the free ends of the sections 32 and 36 and at the points where these respective sections join the section 34. When the tire cover shown in these figures is applied to a tire having an outside diameter somewhat smaller than the tire having the same peripheral curvature as the curvature of the sections of the cover, the cover will contact with the tread portion of the tire chiefly at three points located respectively midway between the ends of the several sections 32, 34 and 36.

It is to be understood that the invention is not limited to the particular construction and arrangement of parts of the illustrated embodiment of the invention, but that the invention may be embodied in other forms within the scope of the claims.

Having explained the nature and object of the invention and having specifically described devices embodying the invention in its preferred forms, what is claimed is:

1. A tire cover comprising a plurality of sections two of which are joined by a spring hinge, the latter including a flexing strap member secured to the undersurface of adjacent ends of the sections, one section end being provided with a raised lip lapping the other section end.

2. A relatively resilient sheet metal tire cover comprising a plurality of sections, two of which are joined to each other by a spring hinge, said hinge including integral opposed tongues associated with the ends of said sections, whereby a spring action is provided in the hinge.

3. A tire cover comprising a plurality of sections, two of which are joined by a spring hinge, the latter including a flexing strap member secured to the under surfaces of adjacent ends of the sections.

GEORGE ALBERT LYON.